United States Patent
Andres et al.

[11] Patent Number: 5,911,642
[45] Date of Patent: Jun. 15, 1999

[54] AUTOMATIC TRANSMISSION

[75] Inventors: Marc Andres, Schiltingheim; Roland Mathis, Ribeauville, both of France

[73] Assignee: Delphi France Automotive Systems, La Garenne-Colombes, France

[21] Appl. No.: 09/004,370

[22] Filed: Jan. 8, 1998

[30] Foreign Application Priority Data

Feb. 19, 1997 [GB] United Kingdom .................... 9703448

[51] Int. Cl.$^6$ ..................................................... F16H 3/72
[52] U.S. Cl. ..................................... 475/2; 475/8; 475/10
[58] Field of Search .................. 475/2, 5, 8, 10

[56] References Cited

U.S. PATENT DOCUMENTS

| | | | |
|---|---|---|---|
| 4,754,664 | 7/1988 | Dick | 74/687 |
| 5,577,973 | 11/1996 | Schmidt | 475/5 |
| 5,669,842 | 9/1997 | Schmidt | 475/5 |
| 5,730,675 | 3/1998 | Yamaguchi | 475/2 |
| 5,730,676 | 3/1998 | Schmidt | 475/5 |

FOREIGN PATENT DOCUMENTS

| | | | |
|---|---|---|---|
| 1 364 962 | 8/1974 | United Kingdom | F16H 47/04 |
| 2 002 862 | 2/1979 | United Kingdom | F16H 47/04 |
| 2 068 064 | 8/1981 | United Kingdom | F16H 37/02 |

*Primary Examiner*—Dirk Wright
*Attorney, Agent, or Firm*—Michael J. Bridges; Donald F. Scherer

[57] ABSTRACT

An automatic transmission (10) comprising a housing (12); a planetary gear train (14) mounted within the housing; an input drive shaft (16) connectable to main drive means (38) to provide input drive to the planetary gear train; an output drive shaft (18) from the planetary gear train; and an auxiliary drive means (E) for providing a variable auxiliary drive input (34) to the planetary gear train; wherein the planetary gear train includes a first planetary gear set (40) and a second planetary gear set (42); the first planetary gear set including a sun gear (44) having a drive input (26) connectable to the input drive shaft and a reaction input (28) connectable to the housing, a pinion gear (46) interengaging with the sun gear, and a pinion carrier (48) on which the pinion gear is rotatably mounted, the pinion carrier having a drive input (24) connectable to the input drive shaft and a reaction input (30,32) connectable to the housing, and being connected with the auxiliary drive input; the second planetary gear set including a sun gear (50) having a drive input (22) connectable with the input drive shaft; and wherein the output drive shaft is driven by a ring gear (54) of the first planetary gear set or the second planetary gear set. Provides an automatic transmission with first and second constant forward gear ratios with a continuously variable gear ratio therebetween.

7 Claims, 2 Drawing Sheets

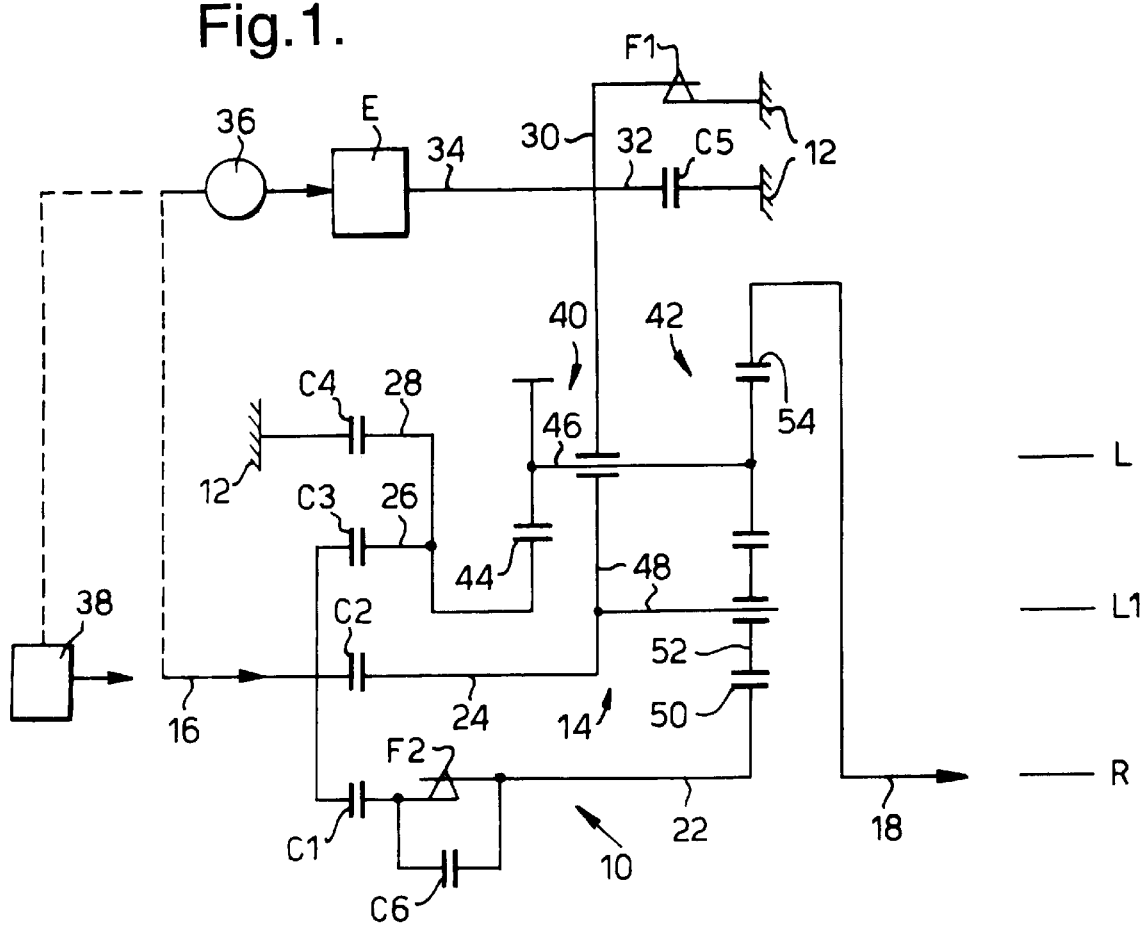

|  | C1 | C6 | C2 | C3 | C4 | C5 | E | F2 | F1 | RATIO |
|---|---|---|---|---|---|---|---|---|---|---|
| R1 | X | X |  |  |  | X |  | X | X | 1+d2/a2 |
| CVR | X | X |  |  |  |  | X | X |  | CVR |
| R2 | X | X | X |  |  |  |  | X |  | 1 |
| R3 | X |  | X |  | X |  |  |  |  | d1/(d1+a1) |
| REV |  |  |  | X | X |  |  |  |  | -d1/a1 |

AUTOMATIC TRANSMISSION

TECHNICAL FIELD

The present invention relates to an automatic transmission having at least two constant forward gear ratios with a continuously variable gear ratio between the two constant forward gear ratios.

BACKGROUND OF THE INVENTION

Automatic transmissions on motor vehicles are known to have a number of constant forward gear ratios. The transmission changes from one gear ratio to the adjacent gear ratio during operation of the motor vehicle. Automatic transmissions on motor vehicles are also known which have a continuously varying forward gear ratio during operation of the motor vehicle.

SUMMARY OF THE INVENTION

It is an object of the present invention to provide an automatic transmission which has both constant forward gear ratios and a continuously variable gear ratio.

An automatic transmission in accordance with the present invention comprises a housing; a planetary gear train mounted within the housing; an input drive shaft connectable to main drive means to provide input drive to the planetary gear train; an output drive shaft from the planetary gear train; and an auxiliary drive means for providing a variable auxiliary drive input to the planetary gear train; wherein the planetary gear train includes a first planetary gear set and a second planetary gear set; the first planetary gear set including a sun gear having a drive input connectable to the input drive shaft and a reaction input connectable to the housing, a pinion gear interengaging with the sun gear, and a pinion carrier on which the pinion gear is rotatably mounted, the pinion carrier having a drive input connectable to the input drive shaft and a reaction input connectable to the housing, and being connected with the auxiliary drive input; the second planetary gear set including a sun gear having a drive input connectable with the input drive shaft; and wherein the output drive shaft is driven by a ring gear of the first planetary gear set or the second planetary gear set.

Actuation of the auxiliary drive means provides a variable drive input on the auxiliary drive input between a first constant forward gear ratio and a second constant forward gear ratio, which thereby provides a continuously variable forward gear ratio between these two constant forward gear ratios. An automatic transmission in accordance with the present invention thereby provides both constant forward gear ratios and a continuously variable forward gear ratio.

BRIEF DESCRIPTION OF THE DRAWINGS

The present invention will now be described, by way of example, with reference to the accompanying drawings, in which:

FIG. 1 is a schematic diagram of a first embodiment of automatic transmission in accordance with the present invention;

FIG. 2 is a table of gear ratio and clutch engagement for the automatic transmission of FIG. 1;

DESCRIPTION OF THE PREFERRED EMBODIMENT

Figures 3, 4:
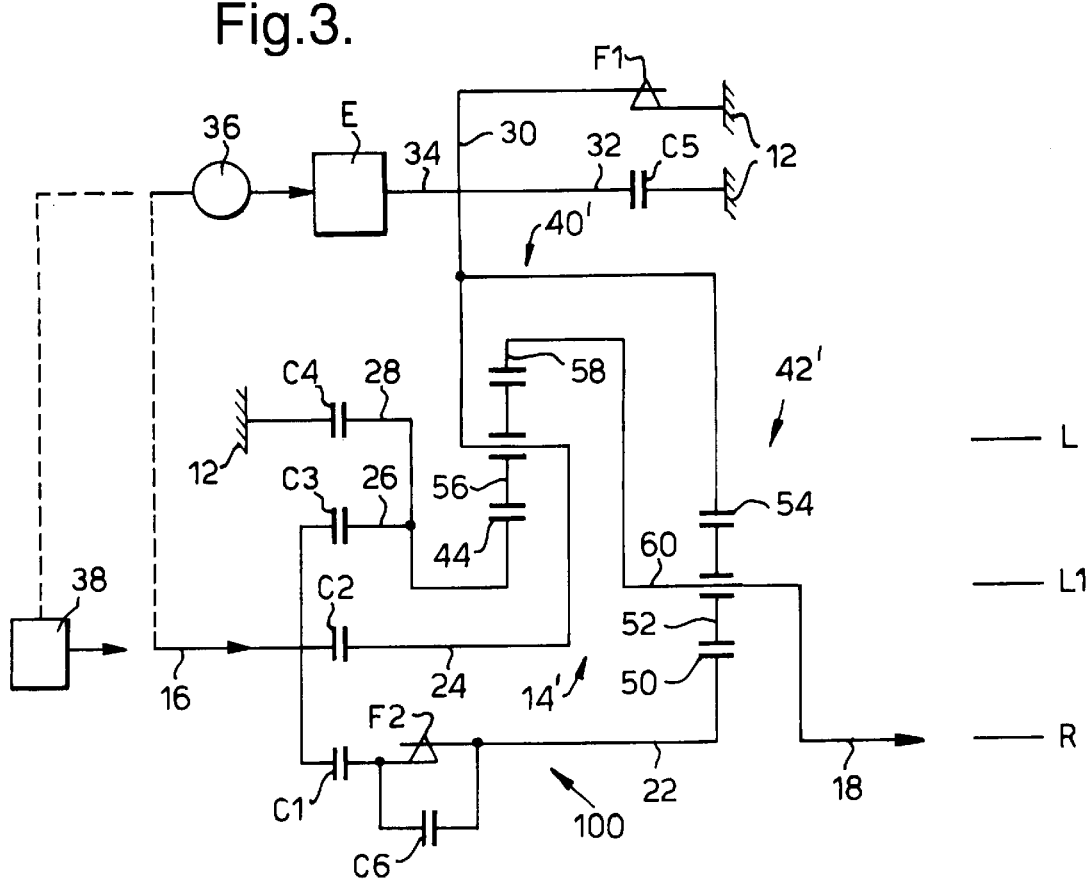
FIG. 3 is a schematic diagram of a second embodiment of automatic transmission in accordance with the present invention.
FIG. 4 is a table of gear ratio and clutch engagement for the automatic transmission of FIG. 3.

Referring to FIG. 1, a first embodiment of automatic transmission 10 in accordance with the present invention is shown. The automatic transmission 10 comprises a housing 12, a planetary gear train 14, an input drive shaft 16, and an output drive shaft 18. The input drive shaft 16 is connectable with the output drive shaft of an internal combustion engine 38, preferably by way of a torque converter (not shown), in any suitable manner known to those skilled in the art. The engine 38 defines main drive means for the automatic transmission 10. The output drive shaft 18 is connected to, and drives, the driven wheels (not shown) of a motor vehicle.

The planetary gear train 14 comprises a first planetary gear set 40 and a second planetary gear set 42. The first planetary gear set 40 comprises a sun gear 44, and a pinion gear 46 interengaging with the sun gear 44. The pinion gear 46 is a long pinion gear. The second planetary gear set 42 comprises a sun gear 50, a short pinion gear 52 interengaging with the sun gear 50, the long pinion gear 46 interengaging with the short pinion gear 52, and a ring gear 54 interengaging with the long pinion gear 46. The pinion gears 46, 52 are rotatably mounted on a common planet carrier 48, preferably by way of low friction bearings, bushings, etc. (not shown). The sun gears 44, 50, and the ring gear 54 have a common centre line R (axis of rotation) which is substantially parallel to the centre lines L, L1 (rotation axes) of the pinion gears 46, 52, respectively. The ring gear 54 drives the output drive shaft 18. Additional identical long pinion gears 46 and short pinion gears 52 may be used in the first and second planetary gear sets 40, 42. The long pinion gears 46 may be equally spaced or non-equally spaced around the circumference of the sun gear 44. In general, there is an equal number of long pinion gears 46 and short pinion gears 52. In some circumstances, there may be twice as many long pinion gears 46 as short pinion gears 52. The number of teeth on the sun gear 44 is a1. The number of teeth on the sun gear 50 is a2. The number of teeth on the ring gear 54 is d2.

The planetary gear train 14 has first, second, and third drive inputs 22, 24, 26, respectively, connectable with the input drive shaft 16. The planetary gear train 14 also has first, second, and third reaction inputs 28, 30, 32, respectively, connectable with the housing 12. The first drive input 22 is connected with the sun gear 50 of the second planetary gear set 42. The second drive input 24 is connected with the planet carrier 48. The third drive input 26 is connected with the sun gear 44 of the first planetary gear set 40. The first reaction input 28 is connected with the sun gear 44 of the first planetary gear set 40. The second and third reaction inputs 30, 32 are connected with the planet carrier 48. The first drive input 22 is connectable with the input drive shaft 16 by way of a first clutch C1. The second input drive 24 is connectable with the input drive shaft 16 by way of a second clutch C2. The third drive input 26 is connectable with the input drive shaft 16 by way of a third clutch C3. The first reaction input 28 is connectable with the housing 12 by way of a fourth clutch C4. The second reaction input 30 is connectable with the housing 12 by way of a first free wheel or one-way coupling F1. The third reaction input 32 is connectable with the housing 12 by way of a fifth clutch C5. A second free wheel or one-way coupling F2 in parallel with a sixth clutch C6 may be positioned between the first clutch C1 and the first drive input 22 to provide engine braking for the automatic transmission 10.

Additionally, an auxiliary input drive 34 is connected to the planet carrier 48. The auxiliary input drive 34 is provided by auxiliary drive means E. The auxiliary drive means E may be an electrically or hydraulically operated drive system, or may be a derivative of the engine 38 passing through a variable speed system. The operation of the auxiliary drive means E is controlled by a control module 36. The control module 36 determines the input speed $\omega_e$ of the input drive shaft 16, and actuates the auxiliary drive means E to provide a variable drive on the auxiliary drive input 34, the auxiliary drive input having an output speed U(t).

Referring to FIG. 2, the automatic transmission 10 is capable of providing a first constant forward gear ratio R1, a second constant forward gear ratio R2, a continuously variable forward gear ratio CVR between the first and second forward gear ratios, a third constant forward gear ratio R3, and a reverse gear ratio REV. The second constant forward gear ratio R2 is preferably direct drive, and the third constant forward gear ratio R3 is an overdrive.

For first constant forward gear ratio R1, the first, fifth, and sixth clutches C1, C5, C6, are engaged (applied), and the first and second one-way couplings F1, F2, are also engaged (under load). The other clutches are disengaged, and the auxiliary drive means E is not operating. The ratio (d2/a2) of the first forward gear ratio R1 is dependent on the number of teeth of the ring gear 54 and the sun gear 50 of the second planetary gear set 42.

For the continuously variable forward gear ratio CVR, the first and sixth clutches C1, C6 are engaged (applied), the second one-way coupling F2 is also engaged (under load), and the auxiliary drive means E is operating. The other clutches are disengaged, and the other one-way coupling F1 acts as an over-running free wheel. The control module 36 controls the operation of the auxiliary drive means E to provide a continuously variable ratio $$CVR=\omega_e R1/\{\omega_e+(R1-1).U(t)\}$$

where the terms are as described above, and where second constant forward gear ratio R2 is 1 (direct drive) as described below.

For second constant forward gear ratio R2, the first, second, and sixth clutches C1, C2, C6, are engaged (applied), and the second one-way coupling F2 is also engaged (under load). The other clutches are disengaged, the other one-way coupling F1 acts as an over-running free wheel, and the auxiliary drive means E is not operating. In this embodiment, the ratio of the second forward gear ratio R2 is 1 (direct drive).

For third constant forward gear ratio R3, the first, second, and fourth clutches C1, C2, C4, are engaged (applied). The other clutches are disengaged, the one-way couplings F1, F2 act as over-running free wheels, and the auxiliary drive means E is not operating. The ratio $\{d2/(d2+a1)\}$ of the third forward gear ratio R3 is dependent on the number of teeth of the ring gear 54 of the second planetary gear set 42 and the sun gear 44 of the first planetary gear set 40.

For reverse gear ratio REV, the third and fifth clutches C3, C5 are engaged (applied). The other clutches are disengaged, the one-way couplings F1, F2 act as over-running free wheels, and the auxiliary drive means E is not operating. The ratio (−d2/a1) of the reverse gear ratio REV is dependent on the number of teeth of the ring gear 54 of the second planetary gear set 42 and the sun gear 44 of the first planetary gear set 40.

The engagement and disengagement of the clutches C1–C6 and one-way couplings F1, F2 is controlled by a transmission control module (not shown) in any manner well known to those skilled in the art, and will not be described in further detail. The transmission control module may incorporate the control module 36 for the auxiliary drive means E. The control module 36, in conjunction with the transmission control module, monitors first and second constant forward gear ratios R1 and R2, to determine when the continuously variable forward gear ratio CVR is required. The control module 36 also monitors other parameters within the system to control the operation of the auxiliary drive means E to provide a smooth change between the gear ratios R1, CVR, and R2.

Referring to FIG. 3, a second embodiment of automatic transmission 100 in accordance with the present invention is shown. The operation of the second embodiment of automatic transmission 100 is substantially the same as the first embodiment of automatic transmission 10 described above, and like parts have been given the same reference numeral.

The main difference lies with the planetary gear train 14', and in particular with the first and second planetary gear sets 40', 42'. The first planetary gear set 40' comprises the sun gear 44, a short pinion gear 56 interengaging with the sun gear 44, and a ring gear 58 interengaging with the pinion gear 56. The second planetary gear set 42' comprises the sun gear 50, the short pinion gear 52 interengaging with the sun gear 50, and the ring gear 54 which in this embodiment interengages with the pinion gear 52. The short pinion gear 56 of the first planetary gear set 40' is rotatably mounted on the planet carrier 48. However, the short pinion gear 52 of the second planetary gear set 42' is mounted on a planet carrier 60 which is separate from the planet carrier 48, which is driven by the ring gear 58 of the first planetary gear set 40', and which drives the output drive shaft 18. The ring gear 58 of the first planetary gear set 40' therefore drives the driven output shaft 18. The ring gear 54 of the second planetary gear set 42' is connected to the planet carrier 48. The number of teeth on the ring gear 58 is d1.

The layout of the clutches C1–C6, one-way couplings F1, F2, and the auxiliary drive means E is the same as for the first embodiment, with corresponding first, second and third input drives 22, 24, 26, and first, second and third reaction drives, 28, 30, 32.

As with the first embodiment, and referring to FIG. 4, the automatic transmission 100 is capable of providing a first constant forward gear ratio R1, a second constant forward gear ratio R2, a continuously variable forward gear ratio CVR between the first and second forward gear ratios, a third constant forward gear ratio R3, and a reverse gear ratio REV. The second constant forward gear ratio R2 is preferably direct drive, and the third constant forward gear ratio R3 is an overdrive.

The sequence of operation of the clutches C1–C6, one-way couplings F1, F2, and auxiliary drive means E is the same as described above with respect to the first embodiment to provide the required gear ratio. In this second embodiment, however, the ratio 1+d2/a2 of the first constant forward gear ratio R1 is dependent on the number of teeth on the ring gear 54 and sun gear 50 of the second planetary gear set 42'. The ratio $\{d1/(d1+a1)\}$ of the third constant forward gear ratio R3 is dependent on the number of teeth on the ring gear 58 and the sun gear 44 of the first planetary gear set 40'. The ratio (−d1/a1) of reverse gear ratio is dependent on the number of teeth on the ring gear 58 and the sun gear 44 of the first planetary gear set 40'. The continuous variable ratio CVR is as described above for the first embodiment, and second constant forward gear ratio R2 is 1 (direct drive).

The present invention may be used with other layouts for the planetary gear train. The automatic transmission of the present invention is primarily intended for use in a motor vehicle. In the latter case, in both of the above embodiments, during second and third constant forward gear ratios, R2 and R3, the auxiliary drive means E may be driven by the control module 36 to provide power to other components on the motor vehicle.

We claim:

1. An automatic transmission comprising a housing; a planetary gear train mounted within the housing; an input drive shaft connectable to main drive means to provide input drive to the planetary gear train; an output drive shaft from the planetary gear train; and an auxiliary drive means for providing a variable auxiliary drive input to the planetary gear train; wherein the planetary gear train includes a first planetary gear set and a second planetary gear set; the first planetary gear set including a sun gear having a drive input connectable to the input drive shaft and a reaction input connectable to the housing, a pinion gear interengaging with the sun gear, and a pinion carrier on which the pinion gear is rotatably mounted, the pinion carrier having a drive input connectable to the input drive shaft and a reaction input connectable to the housing, and being connected with the auxiliary drive input; the second planetary gear set including a sun gear having a drive input connectable with the input drive shaft; and wherein the output drive shaft is driven by a ring gear of the first planetary gear set or the second planetary gear set.

2. An automatic transmission as claimed in claim 1, wherein the variable auxiliary drive input is dependent on the input speed of the input drive shaft.

3. An automatic transmission as claimed in claim 2, wherein actuation of the auxiliary drive means is controlled by a control module which senses the input speed of the input drive shaft, and actuates the auxiliary drive means to provide a forward gear ratio which is continuously variable in dependence on the sensed input speed.

4. An automatic transmission as claimed in any one of claims 1 to 3, wherein the pinion gear of the first planetary gear set is a long pinion gear; wherein the second planetary gear set further includes a pinion gear interengaging with the sun gear of the second planetary gear set, and a ring gear; wherein the long pinion gear of the first planetary gear set also interengages with the pinion gear and the ring gear of the second planetary gear set; wherein the ring gear of the second planetary gear set is said ring gear driving the output shaft; and wherein the pinion gear of the second planetary gear set is rotatably mounted on the planet carrier of the first planetary gear set.

5. An automatic transmission as claimed in any one of claims 1 to 3, wherein the first planetary gear set further includes a ring gear interengaging with the pinion gear of the first planetary gear set; wherein the second planetary gear set further includes a pinion gear interengaging with the sun gear of the second planetary gear set, a ring gear interengaging with the pinion gear of the second planetary gear set, and a planet carrier on which the pinion gear of the second planetary gear set is rotatably mounted; wherein the ring gear of the second planetary gear set is connected to the planet carrier of the first planetary gear set; wherein the ring gear of the first planetary gear set is said ring gear driving the output shaft; and wherein the ring gear of the first planetary gear set is connected to the planet carrier of the second planetary gear set.

6. An automatic transmission as claimed in any one of claims 1 to 5, wherein the drive inputs are connectable to the input shaft by way of clutches; and wherein the reaction inputs are connectable to the housing by way of friction clutches and/or one-way couplings.

7. An automatic transmission as claimed in any one of claims 1 to 6, wherein the drive input to the sun gear of the second planetary gear set is also connectable to the input shaft by way of a one-way coupling connected in parallel with a clutch.

* * * * *